United States Patent
Ballard et al.

(10) Patent No.: US 7,065,620 B2
(45) Date of Patent: Jun. 20, 2006

(54) SYSTEMS AND METHODS FOR BACKING UP DATA

(75) Inventors: Curtis C. Ballard, Eaton, CO (US); William Wesley Torrey, Greeley, CO (US); Michael J. Chaloner, Berkeley (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 232 days.

(21) Appl. No.: 10/657,475

(22) Filed: Sep. 8, 2003

(65) Prior Publication Data
US 2004/0088508 A1    May 6, 2004

Related U.S. Application Data

(63) Continuation-in-part of application No. 09/774,974, filed on Jan. 31, 2001, now Pat. No. 6,662,281.

(51) Int. Cl.
*G06F 12/00* (2006.01)

(52) U.S. Cl. ........................ 711/162; 711/112; 711/113; 711/161

(58) Field of Classification Search ................ 711/162, 711/113, 161, 112
See application file for complete search history.

(56) References Cited

U.S. PATENT DOCUMENTS

| | | | | |
|---|---|---|---|---|
| 5,636,359 | A * | 6/1997 | Beardsley et al. | 711/122 |
| 5,640,530 | A * | 6/1997 | Beardsley et al. | 711/113 |
| 5,920,695 | A * | 7/1999 | Hathorn et al. | 709/208 |
| 6,052,758 | A * | 4/2000 | Crockett et al. | 711/113 |
| 6,681,339 | B1 * | 1/2004 | McKean et al. | 714/5 |
| 6,845,435 | B1 * | 1/2005 | Nagasawa et al. | 711/162 |
| 2005/0044163 | A1 * | 2/2005 | Kitamura et al. | 709/213 |

* cited by examiner

*Primary Examiner*—Kevin Verbrugge
*Assistant Examiner*—Mehdi Namazi

(57) ABSTRACT

A system for backing up data includes a data-directing device configured to receive data to be backed up, a first backup storage device that is communicatively coupled to the data-directing device and that is configured to store the received data, a data-caching device that is coupled to the data-directing device and that is configured to store the received data, a switch that is configured to communicatively couple the data-directing device to a second backup storage device responsive to a backup operation failure, wherein data stored in the data-caching device is transferred to the second backup storage device via the data-directing device responsive to the backup operation failure.

20 Claims, 15 Drawing Sheets

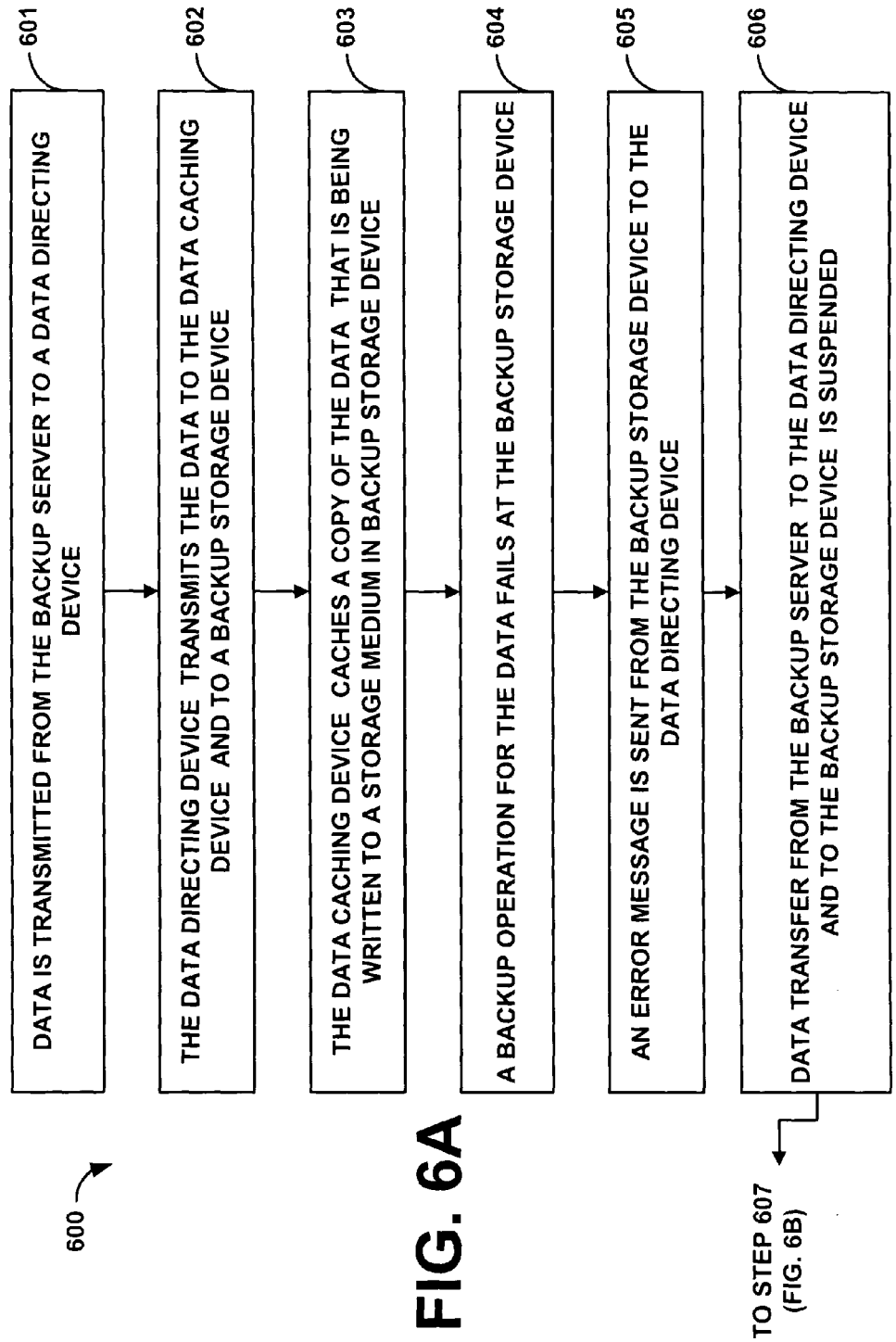

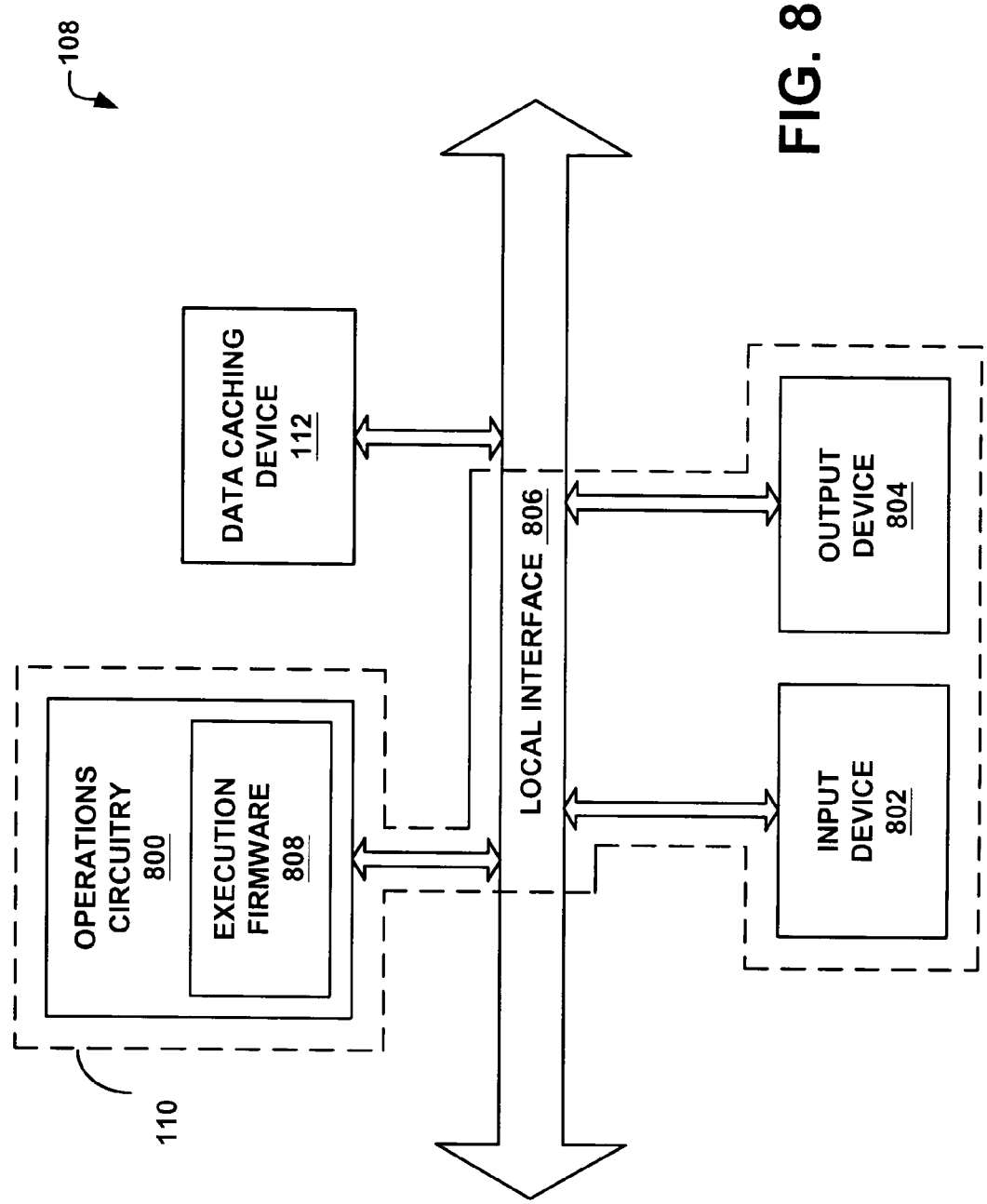

SYSTEMS AND METHODS FOR BACKING UP DATA

CLAIM OF PRIORITY

This application is a continuation-in-part of U.S. utility application entitled "Redundant Backup Device," having Ser. No. 09/774,974, filed on Jan. 31, 2001, now U.S. Pat. No. 6,662,281 which is entirely incorporated herein by reference.

BACKGROUND

Data stored on a network and/or a host computer is often backed up periodically (e.g., once a day) to create a copy of the data. Backing up the data provides an archive of the stored data and prevents it from being lost due to, for example, mechanical failure, software failure, and/or accidental deletion. Normally, "backup" operations entail storing a copy of all or a portion of the data files on the network and/or host computer to a backup storage device such as a magnetic storage medium library that comprises a plurality of magnetic backup storage devices.

Where the network and the amount of data to be backed up is large, the backup process can be quite time consuming and can require substantial resources of a network and/or backup server. For this reason, backup operations often are conducted at night when network usage is smallest. Occasionally, malfunctions occur in the backup system that interrupt the backup process. For instance, where backup storage devices are used, a storage medium can break or become damaged so as to be rendered unusable. Alternatively, the drive in which a storage medium is housed can become dirty and can therefore cease to operate until cleaned. Less frequently, a backup storage device can break and further backup operations cannot be carried out until the drive is replaced.

In any one of above-mentioned situations, human intervention is necessary to rectify the problem and reinitiate the backup process. Where the backup is performed at night, this may require a net administrator or other technician to come into the office (or other network location) during non-business hours. If such an administrator or technician does not attend to the problem, a complete backup of the network and/or host computer files may not take place. In that it often requires a relatively long period of time to complete a backup (e.g., approximately 4 to 6 hours per storage medium), there may not be enough time or network resources available to complete the backup operation the following day. In such instances, a complete backup is not performed and, should a network user lose data, the data may be permanently lost. Therefore, based on the foregoing, it can be seen that it would be desirable to have improved systems and methods for providing redundant backup.

SUMMARY

Disclosed are systems and methods for backing up data. An embodiment of a method for backing up data includes receiving by a data-directing device data to be backed up, the data-directing device being communicatively coupled to a data-caching device and to a first backup storage device, storing the received data by data-caching device, storing the received data by the first backup storage device, configuring a switch to communicatively couple the data-directing device to a second backup storage device responsive to a backup operation failure, and transferring data stored by the data-caching device to the second backup storage device via the data-directing device.

An embodiment of a system for backing up data includes a data-directing device configured to receive data to be backed up, a first backup storage device that is communicatively coupled to the data-directing device and that is configured to store the received data, a data-caching device that is coupled to the data-directing device and that is configured to store the received data, a switch that is configured to communicatively couple the data-directing device to a second backup storage device responsive to a backup operation failure, wherein data stored in the data-caching device is transferred to the second backup storage device via the data-directing device responsive to the backup operation failure.

BRIEF DESCRIPTION OF THE DRAWINGS

The disclosed embodiments can be better understood with reference to the following drawings. The components in the drawings are not drawn to scale. Like reference numerals designate corresponding parts throughout the several views.

FIGS. 6A–6F illustrate an embodiment of a method for backing up data.

FIG. 8 illustrates an example configuration of a secondary backup system 108.

DETAILED DESCRIPTION

Figure 1:
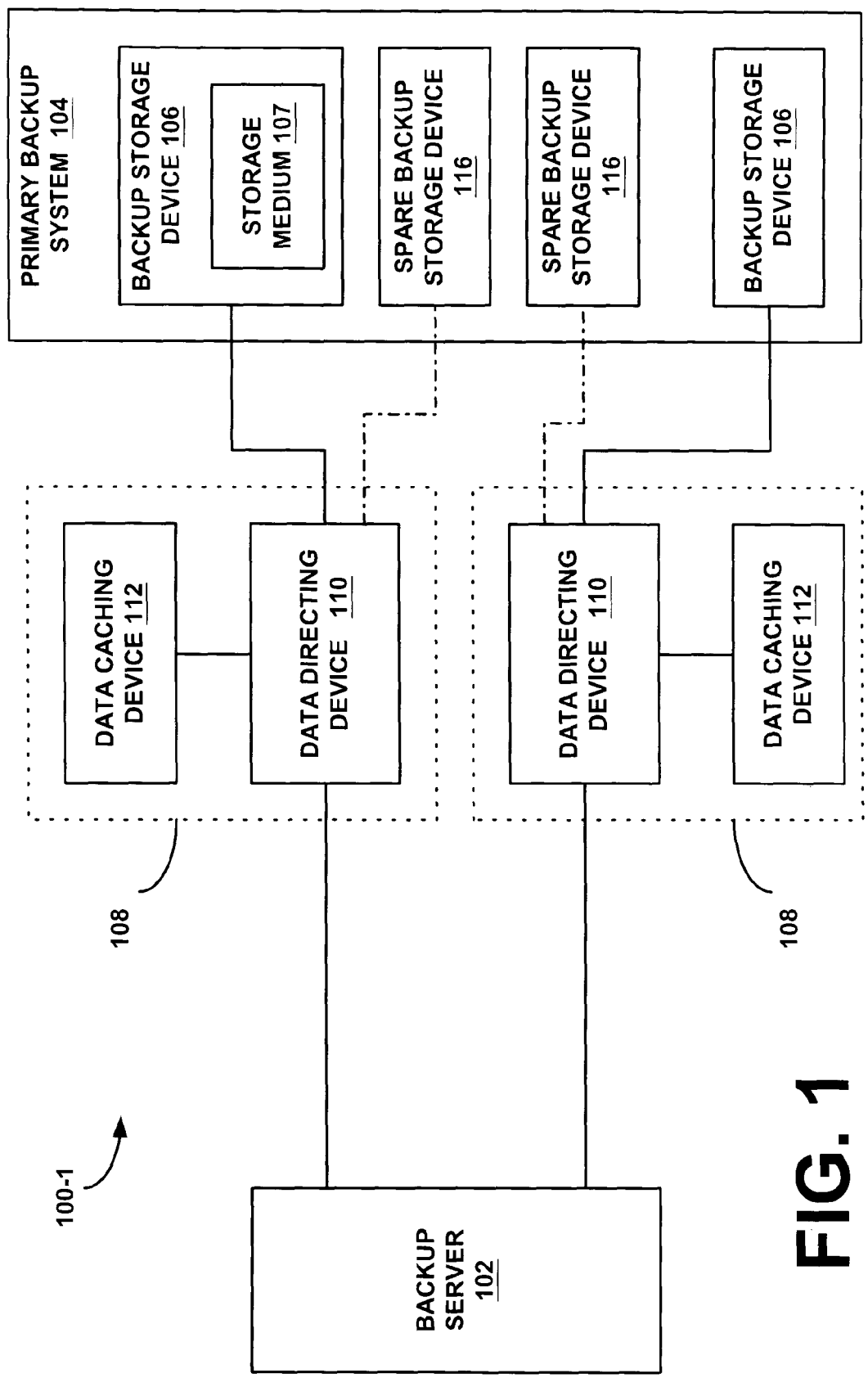
FIG. 1 illustrates an embodiment of a redundant backup system.

FIG. 1 illustrates an embodiment of a redundant backup system 100-1. The redundant backup system 100-1 includes a backup server 102 and a primary backup system 104 that includes a plurality of backup storage devices 106 (e.g., magnetic tape drives). In addition, the backup system 100-1 further includes a plurality of secondary backup systems 108. In one implementation, a secondary backup system 108 is provided for each of the backup storage devices 106 of the primary backup system 104.

Each of the secondary backup systems 108 includes a data-directing device 110 and a data-caching device 112. The data-directing devices 110 intercept commands and messages transmitted between the backup server 102 and the primary backup system 104 such that the data-directing devices 110 can manipulate the operations of the backup server 102 and the primary backup system 104.

The primary backup system 104 includes spare backup storage devices 116.

These spare backup storage devices 116 are used as a failsafe should a backup storage device 106 fail. In one implementation, the spare backup storage devices 116 in the redundant backup system 100-1 are dedicated as spare devices (i.e., are used only when a backup storage device 106 fails).

The primary backup system 104 may comprise a tape library that includes a plurality of writing devices, such as, for example, magnetic tape drives that are configured to write data to magnetic tapes (not shown). When comprising a tape library, the primary backup system 104 may include a robotic arm or other automated mechanism with which tapes may be inserted and removed.

Although described herein as comprising a tape library, the primary backup system 104 may comprise substantially any equivalent backup device used to store a copy of data stored in a backup server 102 (or on a network that is coupled to the backup server 102). Therefore, the primary backup system 104 may alternatively comprise, for example, an optical storage device, and/or a non-volatile random access memory (RAM) device, among others.

The data-caching device 112 of each secondary backup system 108 is capable of caching data transmitted from the backup server 102 to a corresponding data-directing device 110. Accordingly, the data-caching device 112 may cache all of the data that is additionally written to an associated tape of the primary backup system 104.

The data-caching device 112 may comprise, for example, one or more hard disks having a write performance that exceeds that of a corresponding backup storage device 106. The hard disks may be arranged in a striped configuration such that a portion of the data being written to the data-caching device 112 is written to each of the hard disks at any given time. Moreover, the hard disks may be arranged in a redundant array of independent disks (RAID) configuration such that caching with the data-caching device 112 may still occur if one of the hard disks were to become disabled.

It will be appreciated that each data-caching device 112 may comprise substantially any other storage device that is capable of write performance exceeding that of the backup storage devices 106. By way of example, alternative storage devices include non-volatile RAM, re-writable optical storage, and/or a magnetic disk, among others.

The data-directing device 110 is provided with operations circuitry and firmware that enables it to cache (to the data-caching device 112) data that is transmitted from the backup server 102 to the primary backup system 104. In addition, however, the data-directing device 110 is responsible for transmitting this data to its associated backup storage device 106. Accordingly, the data transmitted from the backup server 102 is copied to both the data-caching device 112 and to the backup storage device 106. However, since the data-directing device 110 is placed in between the backup server 102 and the primary backup system 104, the data-directing device is responsible for sending any commands or messages to and from the backup server 102 and the primary backup system 104. Therefore, the secondary backup system 108 has an additional measure of control over the backup process executed by the backup system 100-1.

The data-directing device 110 may be configured to mimic the primary backup system 104 such that the backup server 102 is not aware of the presence of the secondary backup system 108 and instead interprets messages received from the data-directing device 110 as coming directly from the primary backup system 104. With such a configuration, the backup server 102 need not be provided with software to recognize the secondary backup system 108. Accordingly, the backup system 100-1 provides the additional advantage of not requiring additional software or modification of the backup server 102.

The data-directing device 110 may be configured to store data in the data-caching device 112 so that it is an exact image of the data that is written to a storage medium 107. If the data in the data-caching device 112 is an exact image of the data on the storage medium 107, then it can be re-written to a second storage medium 107 while appearing to be exactly the same as it would have been on the previous storage medium 107.

According to one implementation, a pad of unused storage space may be left at the end of a storage medium 107. The pad size may be large enough to handle variations in compression rates and re-write operations. Furthermore, the data-directing device 110 may be configured to report an end-of-storage-medium message prior to the end of a storage medium 107 to avoid a write error occurring too close to the end of the storage medium 107. In this manner, when an error occurs, there is enough storage capacity remaining to enable recreating the data on another storage medium 107.

The backup application software on the server 102 may use a header on a storage medium 107. Such a header may be updated but not completely re-written when a storage medium 107 is re-used. The data-directing device 110 may read the header of the storage medium 107 and load it into the data-caching device 112 immediately after a storage medium 107 is loaded so that the data-caching device 112 would contain a full image of the data. Note that the data-directing device 110 may operate without information about the header size, since it could copy data up to a predetermined file-mark. A header size may be configured to be large enough for desired applications.

The data-directing device 110 may provide the backup server 102 with identification information (e.g., a serial number) corresponding to a backup storage device 106. The data-directing device 110 may provide the backup server 102 with the same serial number regardless of which backup storage device 106 the data-directing device 110 is communicatively coupled to. The serial number of the actual backup storage device 106 that the data-directing device 110 is coupled to may, for example, be reported for diagnostic purposes. The data-directing device 110 may communicate with a backup storage device 106, 116 using, for example, a SCSI or a fibre channel. If a backup storage device 106, 116 is configured to communicate using a fibre channel, then it can be attached in a fabric configuration that enables a data-directing device 110 to communicate with any of a plurality of backup storage devices 106, 116.

In the event that a media failure occurs and a storage medium 107 is replaced with a spare storage medium 107, the primary backup system 104 may continue to report a certain barcode for a replacement storage medium 107 as long as that storage medium 107 remains in the primary backup system 104. The replacement storage medium 107 may have a label with human readable instructions identifying a slot from which the storage medium 107 was removed. The primary backup system 104 may export both a failed storage medium 107 and a requested storage medium 107 and may notify a user via a front panel that the barcode is to be moved from the failed storage medium 107 to the requested storage medium 107.

When a failure occurs at the primary backup system 104, the data-directing device 110 can determine not to inform the backup server 102 of the problem. In such a situation, the backup server 102 will continue to transmit data to be backed up. During this time, the secondary backup system 108 can cache the transmitted data into its data-caching device 112 such that this information is not lost. The secondary backup system 108 may accept the data at a reduced rate while it determines the cause of the problem and corrects it.

If the data-directing device 110 determines that it has received data equivalent to the predetermined capacity of a storage medium 107 before normal operation of the redundant backup system 100-1 has been restored, then the data-directing device 110 may report a "busy" signal to the backup server 102 until the problem is corrected. The "busy" signal informs a backup server 102 that a backup storage device 106 is not ready to accept commands from the backup server 102, but that the backup storage device 102 has not failed.

The "busy" signal may be, for example, one that is defined in a SCSI standard. Once the problem has been rectified, the secondary backup system 108 can rewrite information that has been cached in the data-caching device 112 to a backup storage device 106 substantially simultaneously to caching new data from the backup server 102. To better facilitate this process, it is particularly advantageous for the secondary backup system 108 to have a reading and writing performance level which enables it to both read and write data as quickly as its associated backup storage device 106 can write data. With such an arrangement, time can be saved in that recovery of the lost information may occur substantially simultaneously with the continued backup operation.

To accommodate backup operations where a storage medium 107 is not being re-written (e.g., if data is to be appended to the storage medium 107), then the data-directing device 110 may copy data that is read from or written to the storage medium 107 into a data-caching device 112. Furthermore, when a storage medium 107 is loaded, the data-caching device 112 may store a copy of the header of the storage medium 107.

A redundant backup may be provided for append operations that meet a certain criteria (e.g., if more than a certain portion of a storage medium 107 is empty). User input may be used to determine a threshold of storage capacity consumption in a storage medium 107 for enabling/disabling redundant backup protection for an append operation. For example, if a storage medium 107 is more than X % full (e.g., as determined by user input) then append operations are not protected, and a failure of a backup storage device may result in an error being reported to the backup server 102 by the data-directing device 110. If, however, less that X % of the storage medium 107 is full then the data in the storage medium 107 may be read and copied to the data-caching device 112 device when it is loaded into a backup storage device 106.

An append operation is often performed in order to finish filling a storage medium 107 that was not completely filled after a preceding backup operation. If no other storage mediums were written to between these backup operations, then the data from the first backup operation may still be cached in the data-caching device 112.

A data unit written to a data-caching device 112 may be kept in the data-caching device 112 as long as the storage capacity consumed by such data unit is not needed for caching other data. In this manner, if a storage medium 107 is re-used, a copy of data in the storage medium 107 may still be stored in the data-caching device 112.

The data-caching device 112 may be written in a circular method (e.g., by performing a current write operation at a location immediately following the end of the previous write operation and by looping back to a predetermined starting point when the end of the cache storage is reached). In this manner, some of the data in the data-caching device 112 may be present until another full storage medium 107 write occurs.

The data-caching device 112 may even be large enough to hold an amount of data corresponding to the storage capacity of two or more storage mediums (used in a backup storage device 106). In this manner, data written to a first storage medium 107 is available for rapid recovery even after data has been written to a second storage medium 107.

Figure 2:
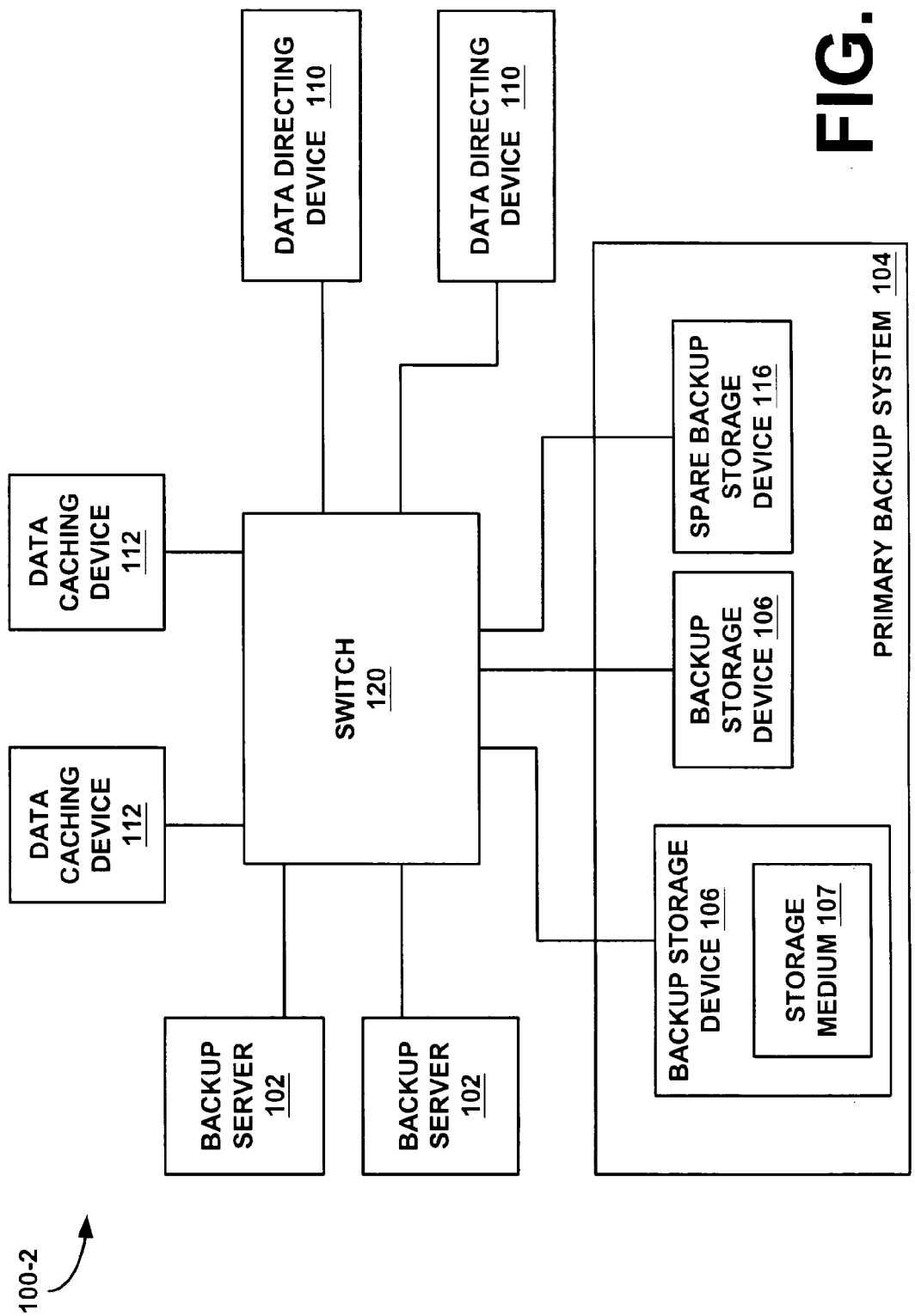
FIG. 2 illustrates an embodiment of another redundant backup system.

FIG. 2 illustrates an embodiment of another redundant backup system 100-2. The redundant backup system 100-2 includes a switch 120 that is coupled to backup servers 102, data-directing devices 110, data-caching devices 112, backup storage devices 106, and spare backup storage devices 116. The switch 120 provides a backup server 102 with access to a data-directing device 110 and provides a data-directing device 110 with access to a data-caching device 112, to a backup storage device 106, and to a spare backup storage device 116. The switch 120 may be configured (e.g., zoned) to enable the backup servers 102 to discover and use the data-directing devices 110 but not the backup storage devices 106 or the spare backup storage device 116. When a backup storage device 106 fails, the data-directing device 110 is provided with access to a spare backup storage device 116 via the switch 120.

Equal numbers of data-caching devices 112 and data-directing devices 110 are preferably used so that each data-directing device 110 may have exclusive use of a data-caching device 112. The number of data-directing devices 110 installed determines the number of backup storage devices that the backup server 102 can use. If a data-directing device 110 is provided for each backup storage device 106 and spare backup storage device 116, then the user may be able to determine which of the backup storage devices 106, 116 in redundant backup system 100-2 are to be used as spare backup storage devices 116 (i.e., determine the ratio of backup storage devices 106 to spare backup storage devices 116).

Figure 3:
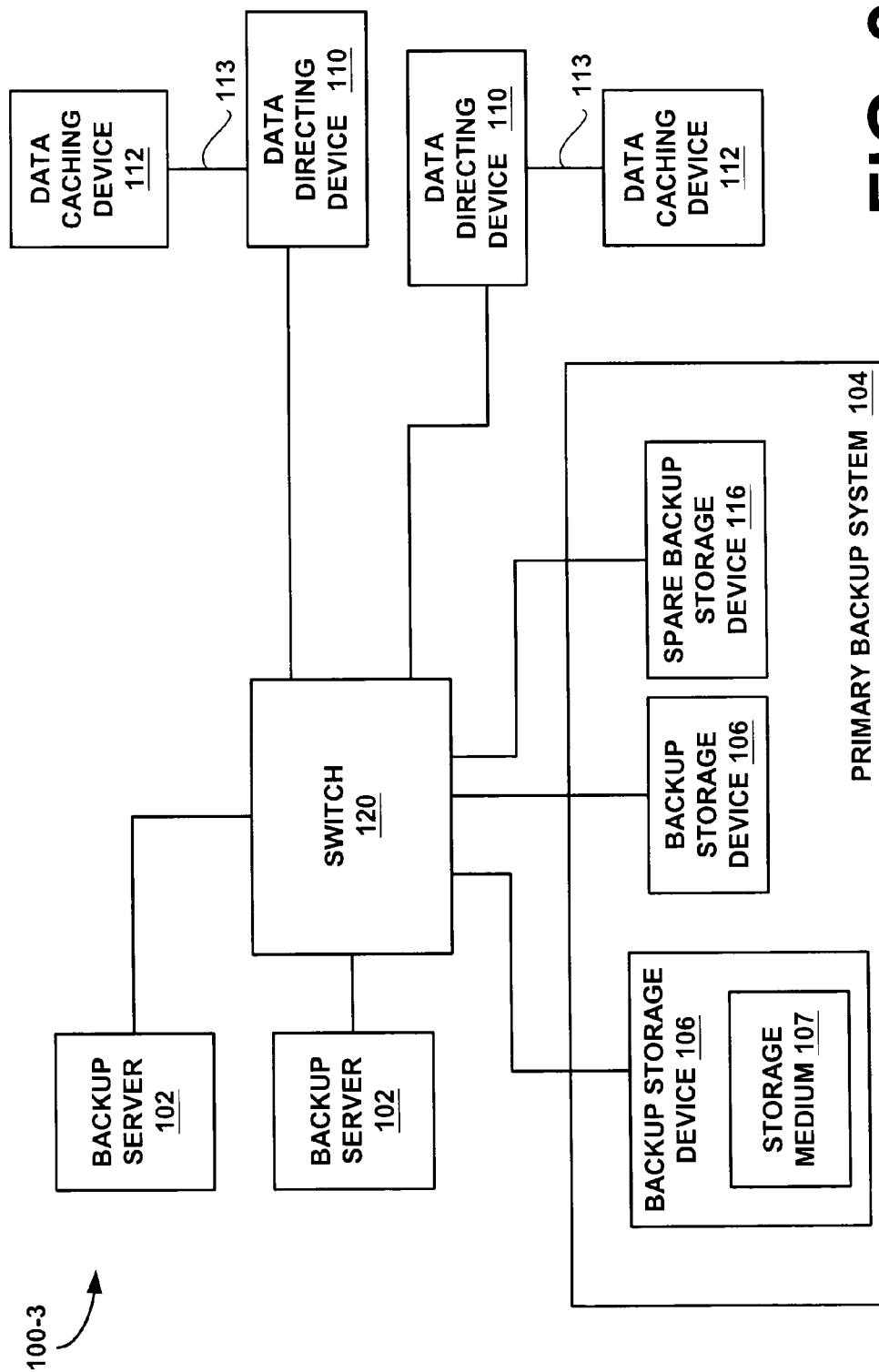
FIG. 3 illustrates an embodiment of a further redundant backup system.

FIG. 3 illustrates an embodiment of a further redundant backup system 100-3. The redundant backup system 100-3 includes a switch 120 that is coupled to backup servers 102, backup storage devices 106, spare backup storage devices 116, and data-directing devices 110. The switch 120 may be, for example, a fibre channel switch. The data-directing devices 110 are coupled to respective data-caching devices 112. The switch 120 provides a backup server 102 with access to a data-directing device 110 and provides a data-directing device 110 with access to a backup storage device 106 or a spare backup storage device 116. The switch 120 may be configured to enable the backup servers 102 to discover and use the data-directing devices 110 but not the backup storage devices 106 or the spare backup storage device 116. The switch 120 may be configured via, for example, a technique known as fibre channel switch zoning. When an backup storage device 106 fails, a data-directing device 110 is provided with access to a spare backup storage device 116 via the switch 120. According to the embodiment shown in FIG. 3, if a data-directing device 110 is provided for each backup storage device 106 and spare backup storage device 116 in the redundant backup system 100-3, then a user may choose to have any desired mix of backup storage devices 106 and spare backup storage devices 116.

The cables 113 used for directly connecting the data-directing device 110 to a data-caching device 112 may be thicker, more expensive, and shorter than cables that might be used to form an indirect connection (e.g., a fibre channel connection). As a result, these cables 113 may be difficult to route (due to their thickness), and the range of locations for the data-caching devices 112 (e.g., relative to the location of the data-directing devices 110) may be very limited (due to the limited length of the cables 113).

Figure 4:
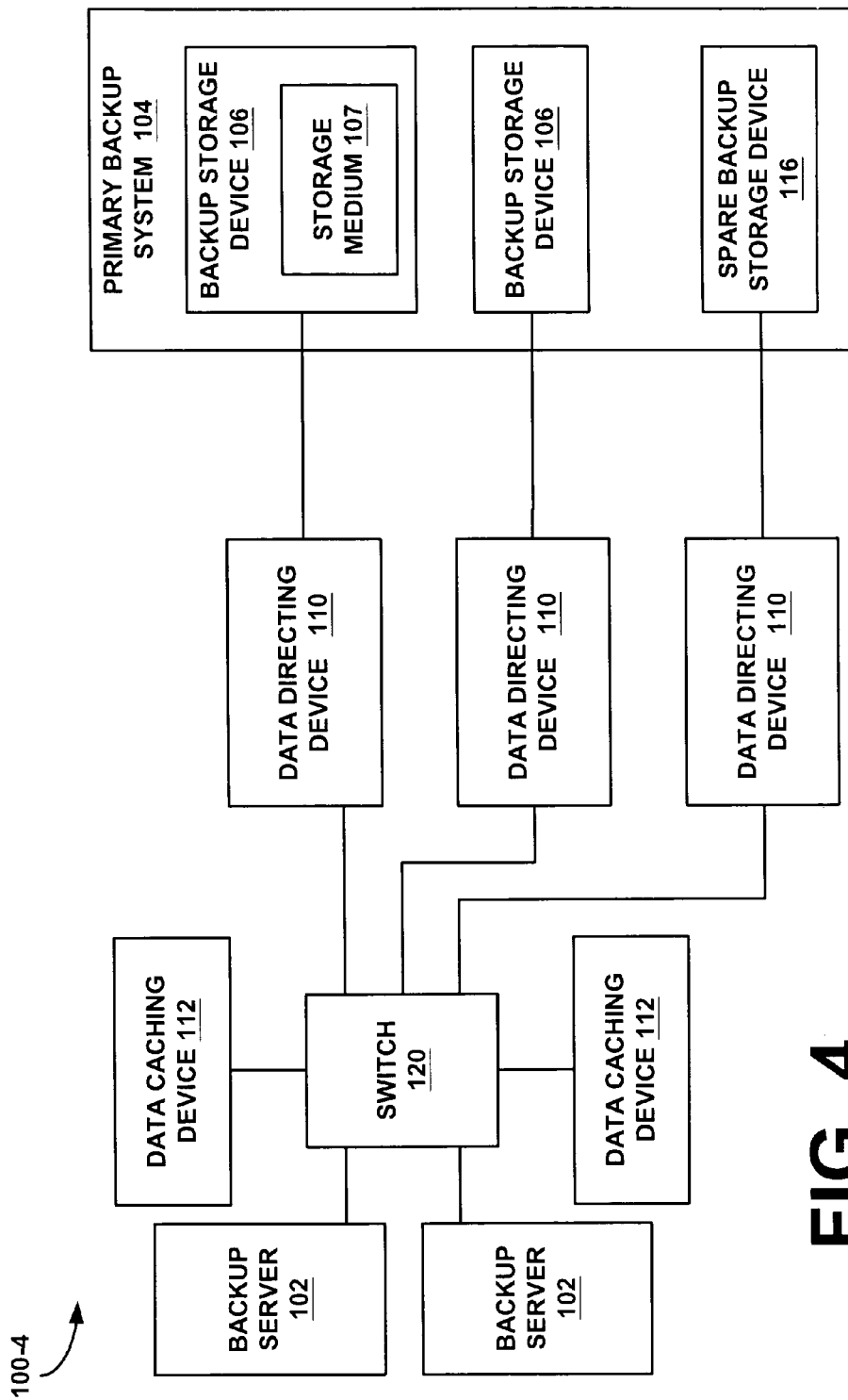
FIG. 4 illustrates an embodiment of yet another redundant backup system.

FIG. 4 illustrates an embodiment of yet another redundant backup system 100-4. The redundant backup system 100-4 includes a switch 120 that is coupled to backup servers 102, data-caching devices 112, and data-directing devices 110. Each data-directing device 110 is coupled to a backup storage device 106 or to a spare backup storage device 116. The switch 120 provides a backup server 102 with access to a data-directing device 110, and provides a data-directing device 110 with access to a data-caching device 112. The switch 120 may be configured (e.g., zoned) to enable the backup servers 102 to discover and use the data-directing devices 110 but not the data-caching devices 112. The redundant backup system 100-4 shown in FIG. 4 enables any of the backup storage devices 106 to be used as a spare backup storage device 116, and vice versa.

Figure 5:
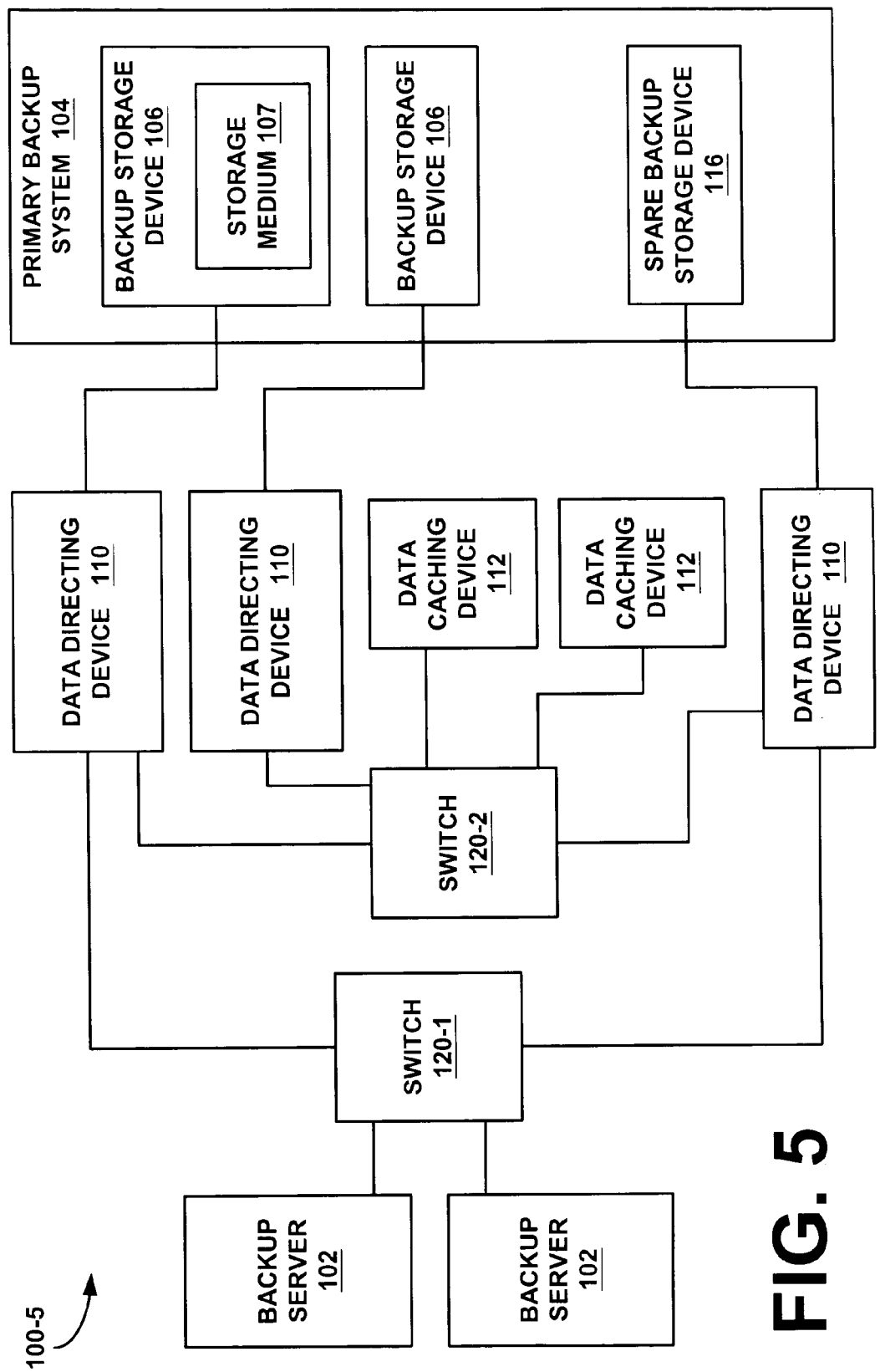
FIG. 5 illustrates an embodiment of a further redundant backup system.

FIG. 5 illustrates an embodiment of a further redundant backup system 100-5. A switch 120-1 is configured to communicatively couple backup servers 102 to data-directing devices 110. Another switch 120-2 is configured to communicatively couple the data-directing devices 110 to data-caching devices 112. Since the backup server 102 and the data-caching device 112 are coupled to different switches 120-1 and 120-2, zoning of the switches 120-1 and 120-2 is not required, and the switches 120-1 and 120-2 may be smaller, less expensive, and easier to connect than, for example, the switch 120 shown in FIG. 4.

Each data-directing device 110 is coupled to a backup storage device 106 or to a spare backup storage device 116. According to the example shown in FIG. 5, data from backup servers 102 may be stored in any backup storage device 106 and any data-caching devices 112, depending on configurations of the switch 120-1 and the switch 120-2. Furthermore, any backup storage device 106 may be used as a spare backup storage device 116, and vice versa.

FIGS. 6A–6F illustrate a method 600 for backing up data using the backup systems 100-2 and 100-3 shown in FIGS. 2 and 3, respectively. As indicated in step 601, data is transmitted from the backup server to a data-directing device 110. The data-directing device 110 then transmits the data to the data-caching device 112 and to a backup storage device 106 (preferably substantially simultaneously), as indicated in step 602. The data-caching device 112 caches a copy of the data (preferably an exact image of the contents of the tape) that is being written to a storage medium 107 in the backup storage device 106, as indicated in step 603.

Figure 6B:
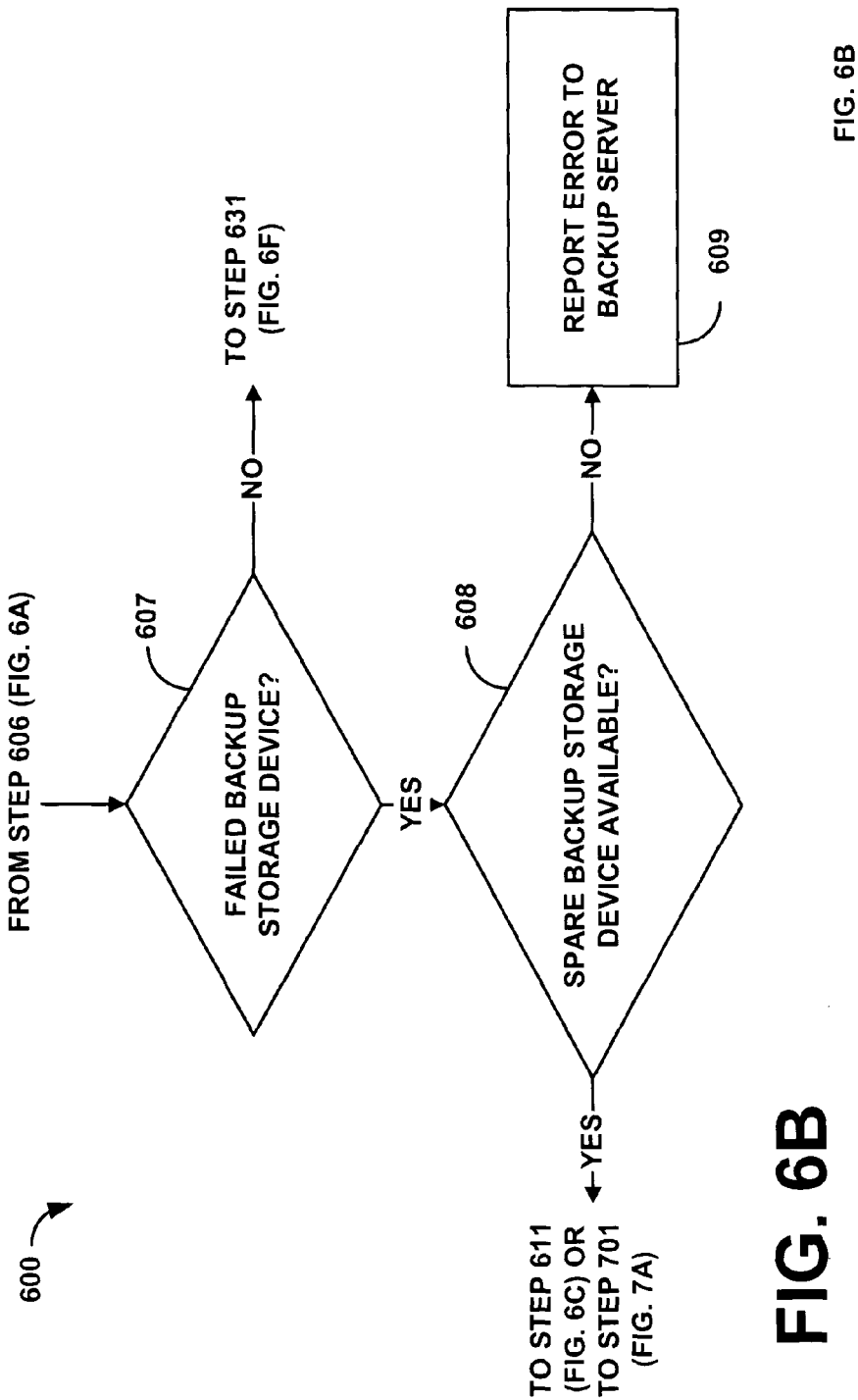

When a backup operation for the data fails at the backup storage device 106, as indicated in step 604, then an error message is sent from the backup storage device 106 to the data-directing device 110, as indicated in step 605. Responsive to the error message, data transfer from the backup server 102 to the data-directing device 110 and to the backup storage device 106 is suspended, as indicated in step 606. Also responsive to the error message, a determination is made as to whether the backup storage device 106 has failed, as indicated in step 607 (FIG. 6B).

Suspending data transfer (as indicated in step 606) may be accomplished by having the data-directing device 110 delay the return of an acknowledgement of a command received from the backup server 102. The acknowledgement may be delayed until the data-directing device 110 is ready for a resumption of data transfer. Suspending data transfer may alternatively be accomplished by having the data-directing device 110 delay a request for data.

If it is determined that the backup storage device 106 has not failed, then the method 600 proceeds to step 631 (FIG. 6F) or to step 620 (FIG. 6D), depending on a desired implementation. If, however, it is determined that the backup storage device 106 has failed, then a determination is made as to whether a spare backup storage device 116 is available, as indicated in step 608 (FIG. 6B). If a spare backup storage device 116 is not available, then the data-directing device 110 reports an error to the backup server 102, as indicated in step 609. If, however, a spare backup storage device 116 is available, then the method 600 proceeds to step 611 (FIG. 6C) or step 701 (FIG. 7A), depending on a desired implementation.

Figure 6C:
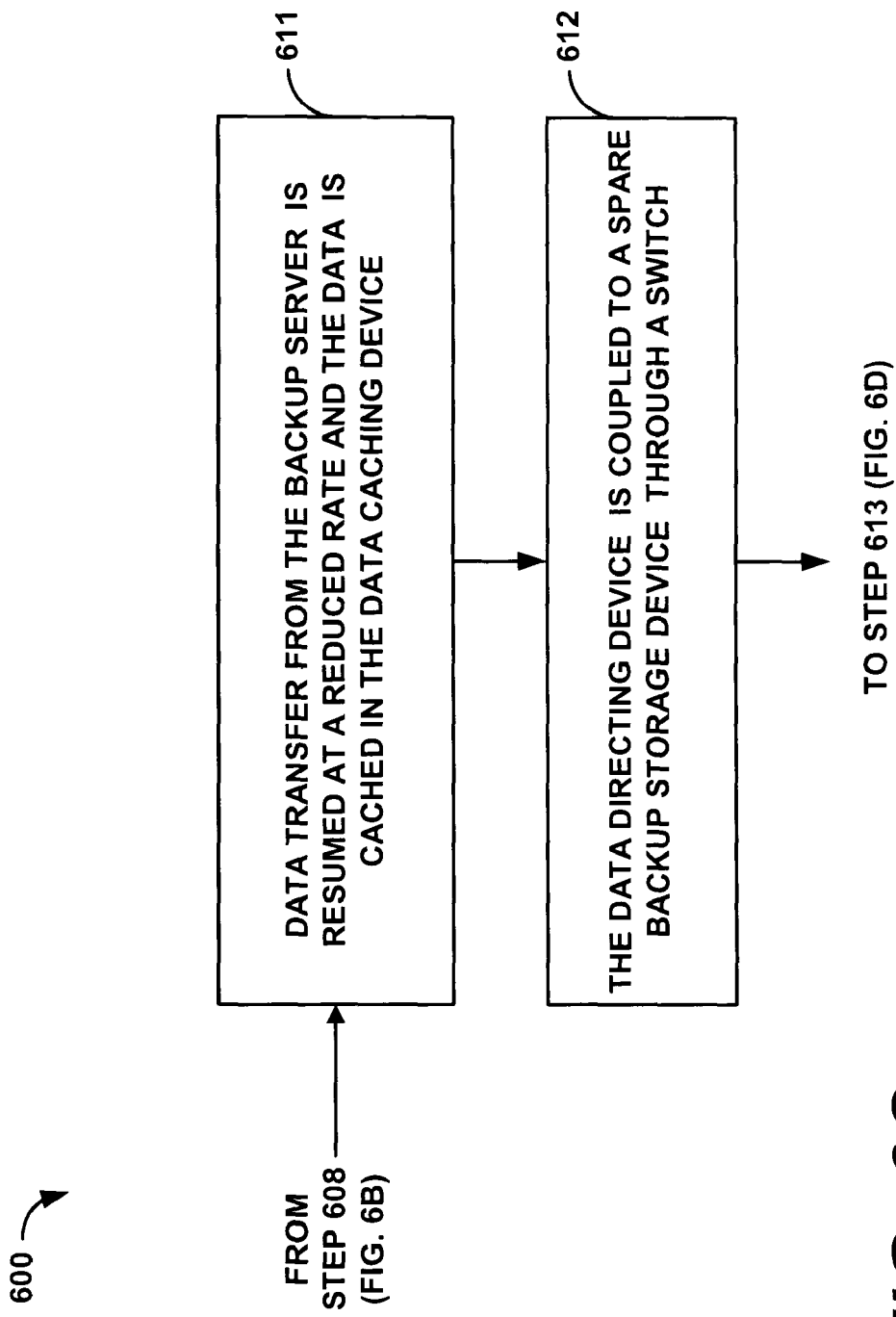

With reference to FIG. 6C, after it is determined that a spare backup storage device 116 is available, data transfer from the backup server 102 is resumed at a reduced rate and the data from the backup server 102 is cached in the data-caching device 112, as indicated in step 611. Resuming data transfer at a reduced rate enables error recovery to be completed before an amount of data equivalent to the capacity of a storage medium 107 (in a backup storage device 106) is received by the data-directing device 110 from the backup server 102. The data-directing device 110 may report a "busy" signal if such an amount of data is received before the error recovery process is completed. However, if the data-caching device 112 has sufficient storage capacity, the data-directing device 110 may be configured to continue accepting data from the backup server 102 even after the amount of data received by the data-directing device has exceeded the storage capacity of a storage medium 107. This additional data that is cached in the data-caching device 112 may later be stored in another storage medium 107.

The data-directing device 110 is then coupled to a spare backup storage device 116 through a switch 120 (FIGS. 2 or 3), as indicated in step 612. As mentioned above, the switch 120 may be, for example, a fibre channel switch. A determination is then made as to whether a storage medium 107 can be unloaded from the failed backup storage device 106, as indicated in step 613 (FIG. 6D).

Figure 6D:
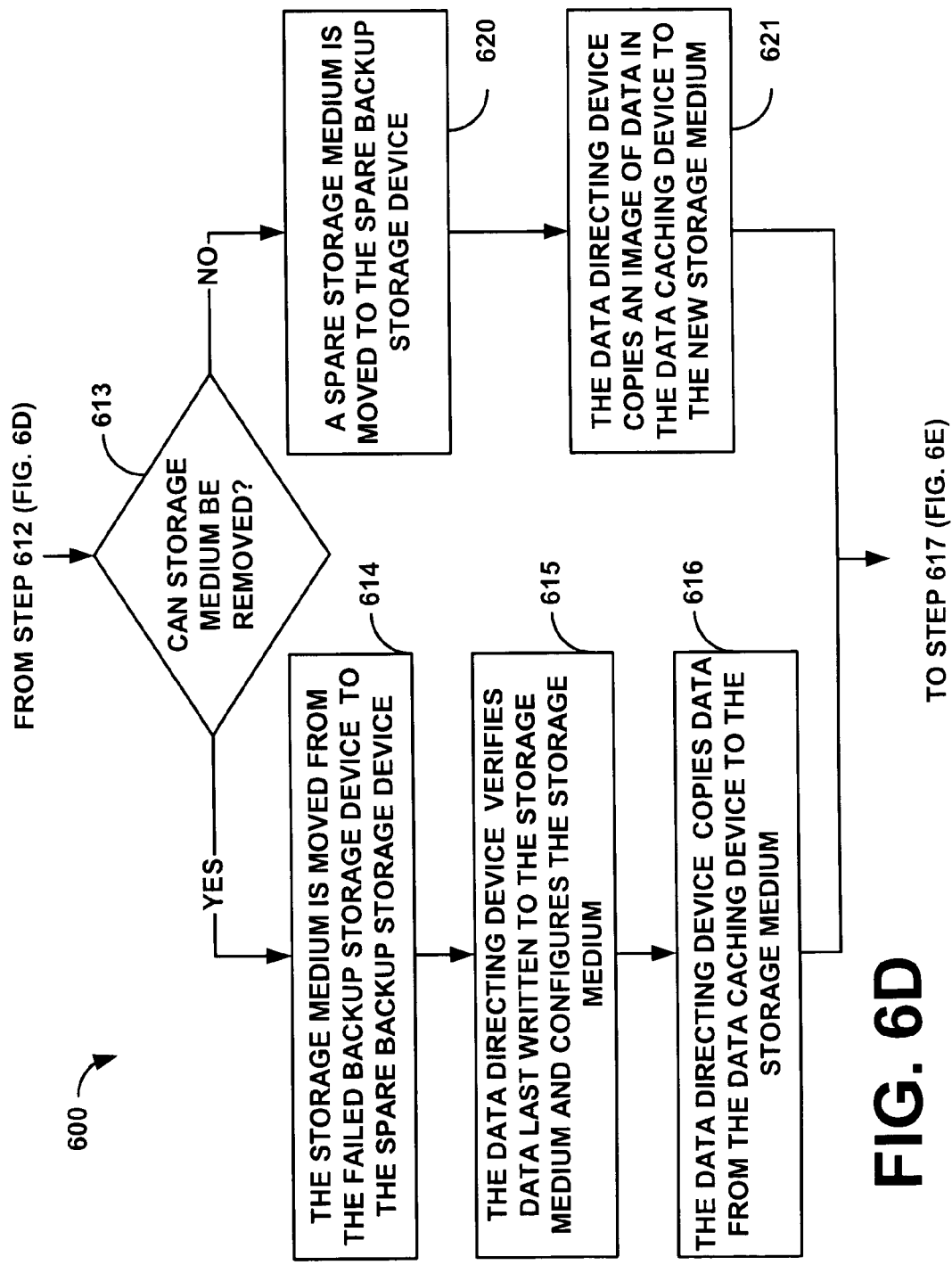

With reference to FIG. 6D, if it is determined that a storage medium 107 can be unloaded from the failed backup storage device 106, then the storage medium 107 is moved from the failed backup storage device 106 to the spare backup storage device 116 (e.g., by a robot arm), as indicated in step 614. The data-directing device 110 then verifies data last written to the storage medium 107 against data in the data-caching device 112 and configures the storage medium 107 such that subsequent data is written to the storage medium 107 beginning at a location where data was last successfully written to the storage medium 107, as indicated in step 615. The data-directing device 110 then copies an image of data from the data-caching device 112 to the storage medium 107 beginning at a location in the data-caching device 112 corresponding to where data was last successfully written to the storage medium 107, as indicated in step 616.

Figure 6E:
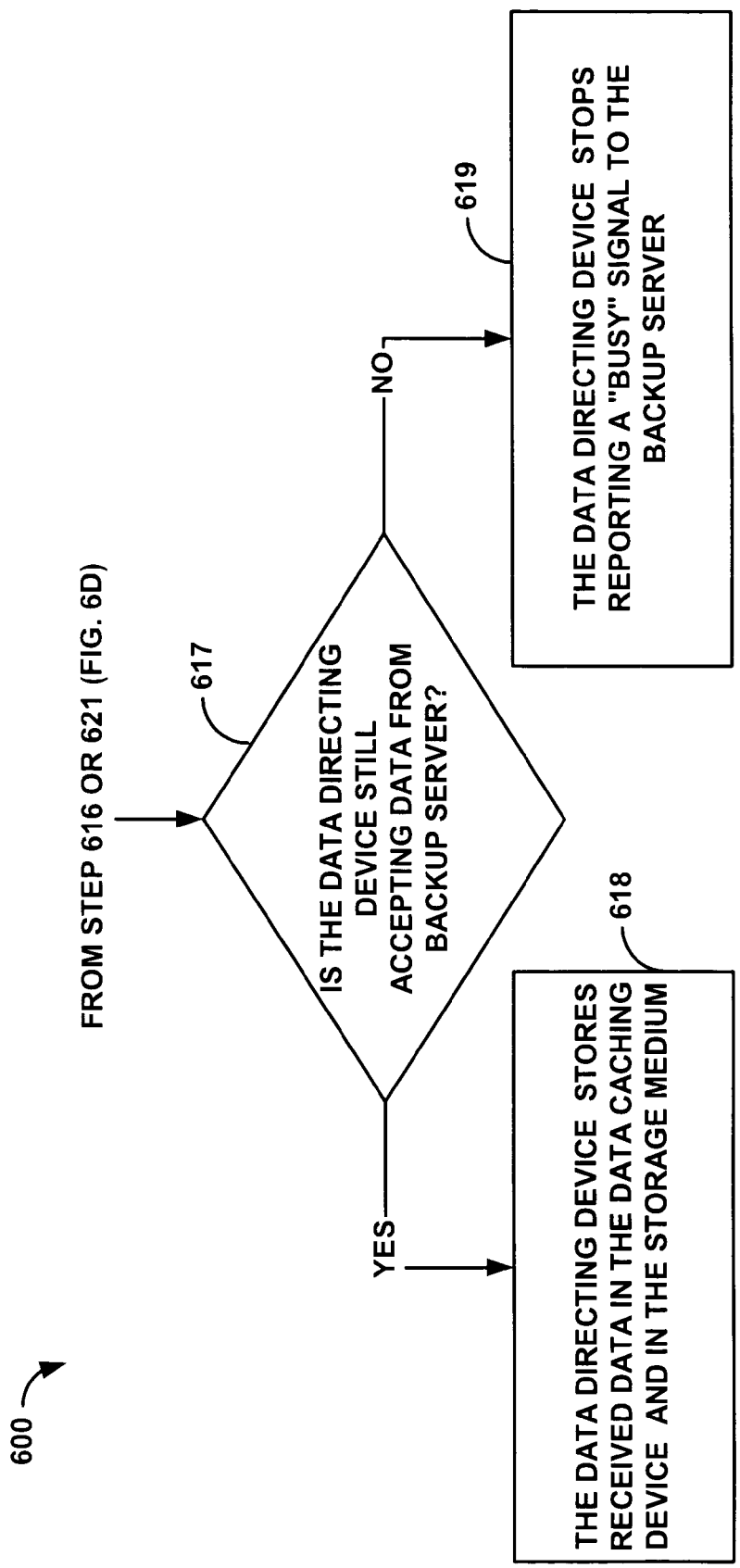

With reference to FIG. 6E, a determination is then made as to whether the data-directing device 110 is still accepting data from the backup server 102, as indicated in step 617. If it is determined that the data-directing device 110 is still accepting data from the backup server 102, the data-directing device 110 resumes storing received data in the data-caching device 112 and in the storage medium 107, as indicated in step 618. If, however, it is determined that the data-directing device 110 is no longer receiving data from the backup server 102, then the data-directing device 110 stops reporting a "busy" signal to the backup server 102 so that the backup operation can continue, as indicated in step 619.

Referring back to step 613 (FIG. 6D), if it is determined that a storage medium 107 can not be unloaded from the failed backup storage device, then a spare storage medium 107 is moved to an unused backup storage device 116, as indicated in step 620. The data-directing device 110 then copies an image of data in the data-caching device 112 to the spare storage medium 107, as indicated in step 621, and the method 600 proceeds to step 617 (FIG. 6E).

Figure 6F:
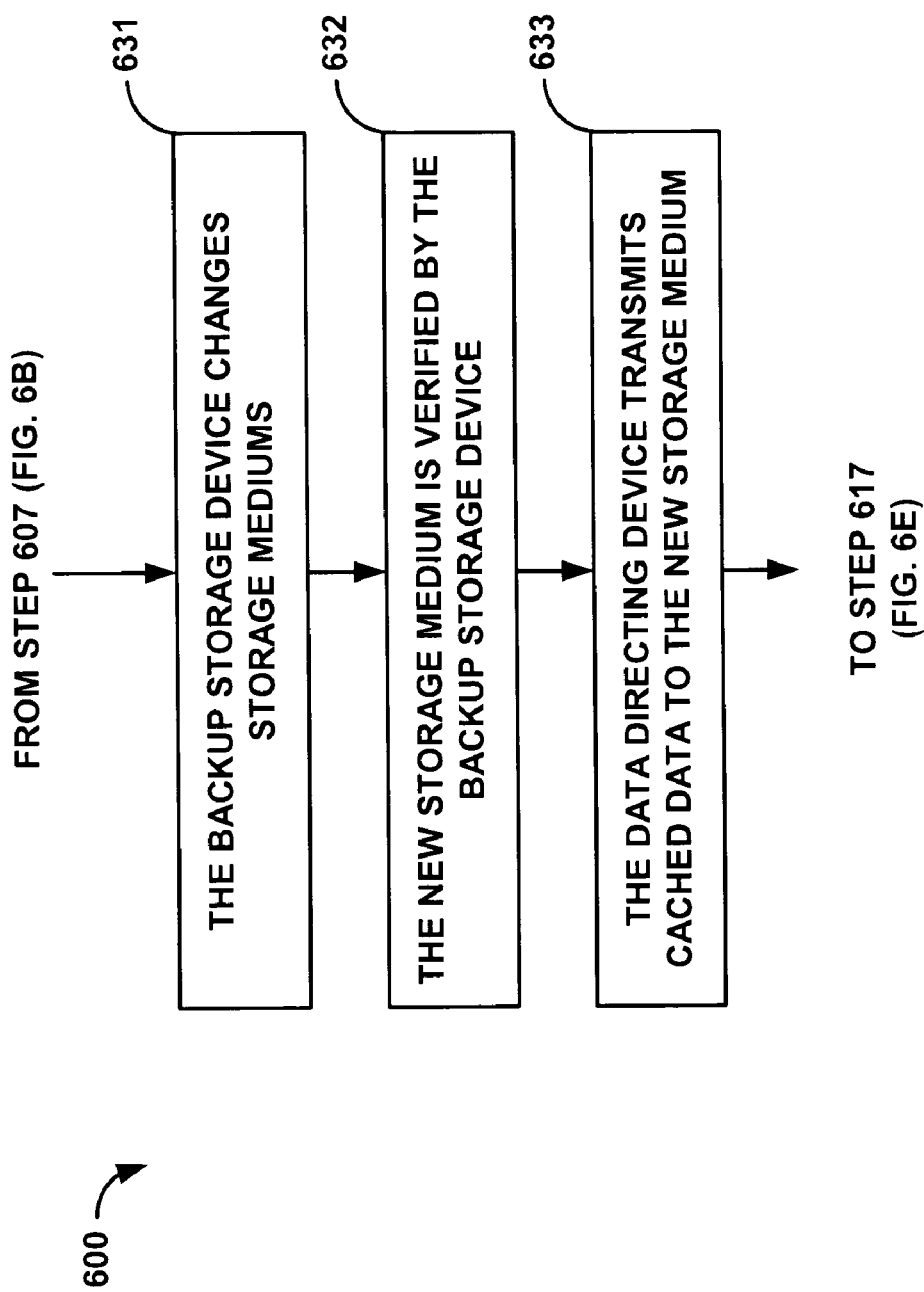

Referring to FIG. 6F, a primary backup system 104 removes a current storage medium 107 and inserts a new storage medium 107 within the backup storage device 106, as indicated in step 631. The new storage medium 107 is verified by the primary backup system 104, as indicated in step 632, to ensure that it is empty and fully functional. The data-directing device 110 then transmits the cached data to the new storage medium 107 residing in the backup storage device 106, as indicated in step 633. During this time period, the data-directing device 110 continues to transmit data from the backup server 102 to the data-caching device 112. Accordingly, despite the interruption that occurred due to the failure of the storage medium 107, the backup server 102 continues to execute the backup process. Therefore, the backup server 102 may have a longer backup time but avoids errors that cause backup failures requiring human intervention.

Figure 7A:
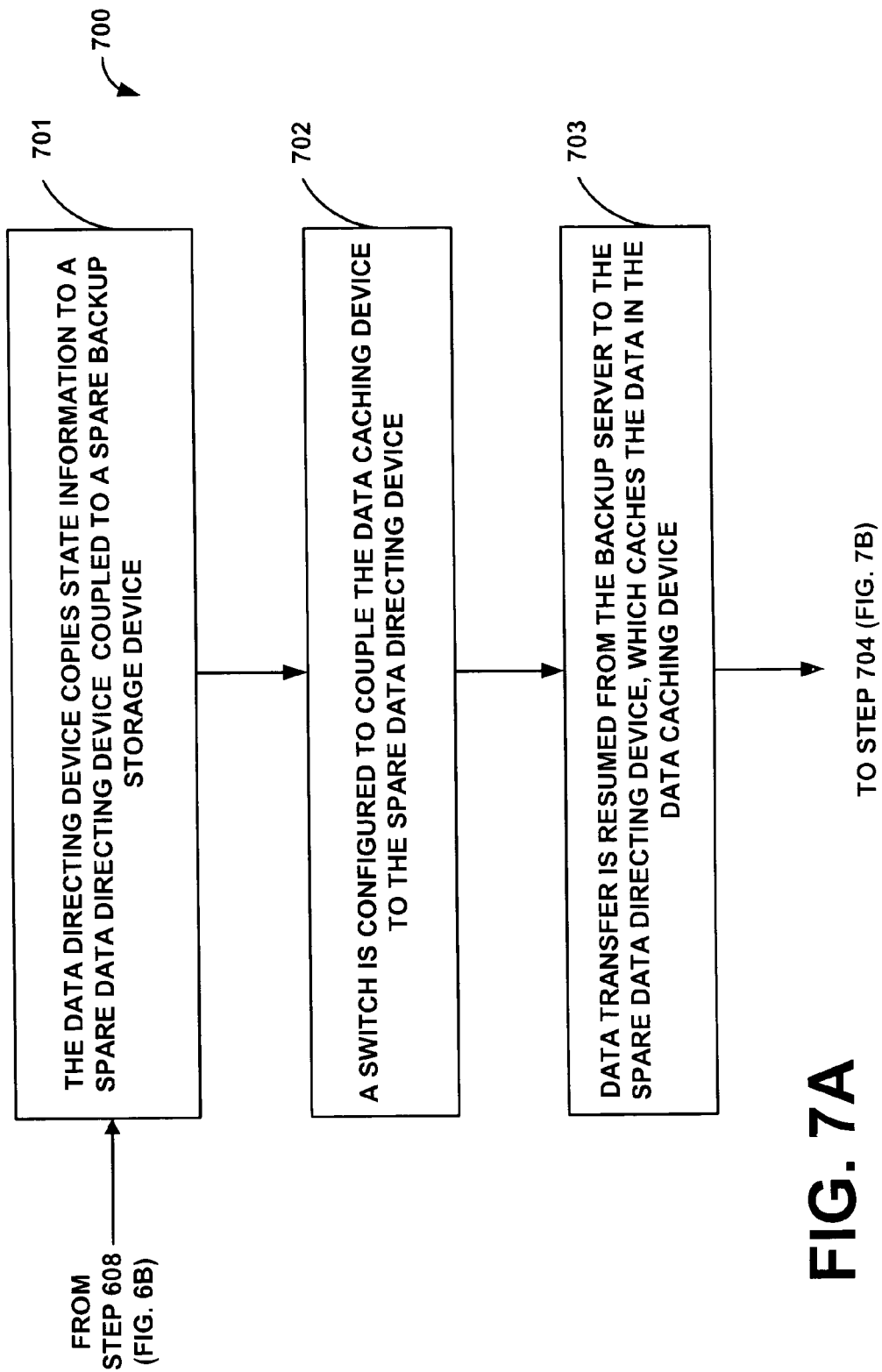
FIGS. 7A–7C illustrate an embodiment of another method for backing up data.
Figure 7B:
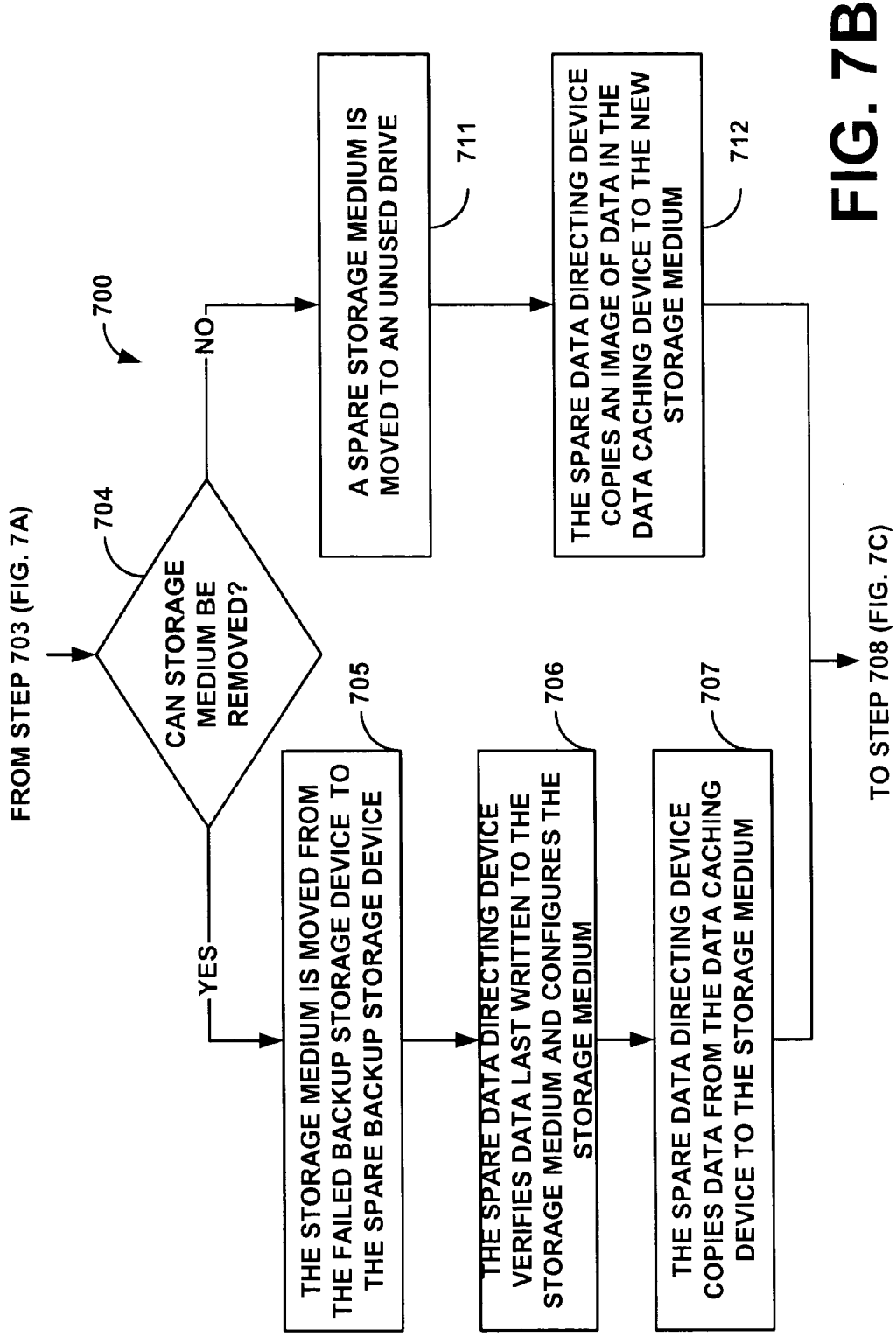
Figure 7C:
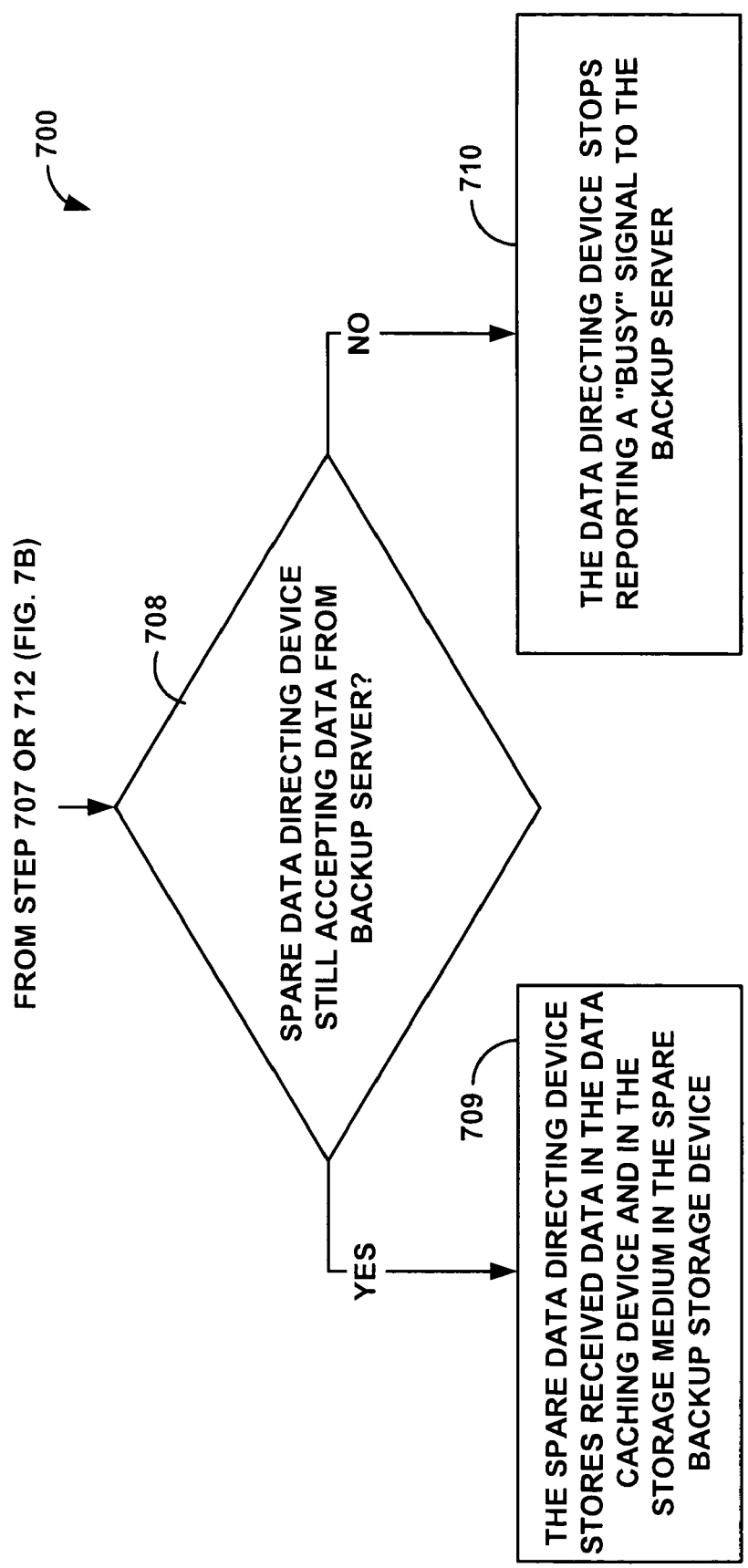

FIGS. 7A–7C illustrate a method 700 that represents an alternative embodiment to the steps of method 600 illustrated in FIGS. 6C–6E. The method 700 may be used, for example, to backup data using the backup systems 100-4 and 100-5 shown in FIGS. 4 and 5, respectively. As indicated in step 701, the data-directing device 110 copies state information to a spare data-directing device 110 that is coupled to a spare backup storage device 116. A switch 120 is then configured to couple the data-caching device 112 to the spare data-directing device 110, as indicated in step 702. Data transfer is resumed (preferably at a reduced rate) from the backup server 102 to the other data-directing device 110, which caches the data in the data-caching device 112, as indicated in step 703. Because the complete state and identify information is copied from the original data-directing device 110 to the other data-directing device 110, the backup server 102 is not aware of any changes to the backup process resulting from a failed backup operation.

Referring to FIG. 7B, a determination is then made as to whether a storage medium 107 can be unloaded from the failed backup storage device, as indicated in step 704. If it is determined that a storage medium 107 can be unloaded from the failed backup storage device, then the storage medium 107 is moved from the failed backup storage device to a spare backup storage device 116 (e.g., by a storage medium library robot arm), as indicated in step 705.

After the storage medium 107 is moved to the spare backup storage device 116, the spare data-directing device 110 verifies data last written to the storage medium 107 against data in the data-caching device 112 and configures the storage medium 107 such that subsequent data is written to the storage medium 107 beginning at a location where data was last written successfully, as indicated in step 706. The spare data-directing device 110 then copies an image of data from the data-caching device 112 to the storage medium 107 beginning at a location in the data-caching device 112 corresponding to where data was last successfully written to the backup storage device, as indicated in step 707.

Referring to FIG. 7C, a determination is then made as to whether the spare data-directing device 110 is still accepting data from the backup server 102, as indicated in step 708. If it is determined that the spare data-directing device 110 is still accepting data from the backup server 102, then the spare data-directing device 110 resumes storing received data in the data-caching device 112 and in the storage medium 107 in the spare backup storage device, as indicated in step 709. If, however, it is determined that the spare data-directing device 110 is no longer receiving data from the backup server 102, then the spare data-directing device 110 stops reporting a "busy" signal to the backup server 102 so that the backup operation can continue, as indicated in step 710.

Referring back to step 704 (FIG. 7B), if it is determined that a storage medium 107 can not be unloaded from the failed backup storage device, then a new spare storage medium 107 is moved to a spare backup storage device 116, as indicated in step 711. The spare data-directing device 110 then copies an image of data in the data-caching device 112 to the new storage medium 107, as indicated in step 712, and the method 700 then proceeds to step 708 (FIG. 7C).

FIG. 8 illustrates an example configuration of a secondary backup system 108. As indicated in this figure, the data-directing device 110 includes operations circuitry 800, an input device 802, and an output device 804. The operations circuitry 800 is connected to the input device 802 and the output device 804 through a local interface 806. Through the input and output devices 802 and 804, the operations circuitry 800 is coupled to the backup server 102 and the primary backup system 104.

The operations circuitry 800 may comprise a plurality of electrical circuits that are provided with execution firmware 808 embedded therein. With the provision of this firmware 808, the data-directing device 110 can recognize and interpret messages received from the backup server 102 or the primary backup system 104. In addition, the firmware 808 enables the data-directing device 110 to transmit data to an associated backup storage device 106, 116.

Persons having ordinary skill in the art will understand that where software or firmware is used, it can be transported on any computer-readable medium for use by or in connection with an instruction execution system, apparatus, or device, such that a computer-based system, processor containing system, or other system can fetch the instructions from the instruction execution system, apparatus, or device and execute the instructions.

In the context of this disclosure, a "computer-readable medium" can be a means that can contain, store, communicate, propagate, or transport the program for use by or in connection with the instruction execution system, apparatus or device. A computer-readable medium can be, for example, an electronic, magnetic, optical, electromagnetic, infrared, or semiconductor system, apparatus, device, or propagation medium. More specific examples of computer-readable media include the following: an electrical connection having one or more wires, camera memory card, affordable computer diskette, a random access memory (RAM), a read only memory (ROM), an erasable programmable read only memory (EPROM or Flash memory), an optical fibre, and a portable compact disk read only memory (CD ROM).

What is claimed is:

1. A method for backing up information, comprising:
receiving by a data-directing device data to be backed up, the data-directing device being communicatively coupled to a data-caching device and to a first backup storage device;
storing the received data by the data-caching device;
storing the received data by the first backup storage device;
configuring a switch to communicatively couple the data-directing device to a second backup storage device responsive to a backup operation failure; and
transferring data stored by the data-caching device to the second backup storage device via the data-directing device, wherein the data-directing device is configured to mimic the first backup storage device when the second backup storage device is in use.

2. The method of claim 1, wherein the switch is a fibre channel switch.

3. The method of claim 1, wherein the backup storage devices are storage medium drives.

4. The method of claim 1, wherein the received data is stored on a storage medium by the backup storage device.

5. The method of claim 1, wherein storing the received data by the data-caching device and storing the received data by the first backup storage device are performed substantially simultaneously.

6. A method for backing up information, comprising:
receiving by a first data-directing device data to be backed up, the first data-directing device being communicatively coupled to a first data-caching device and to a first backup storage device;
storing the received data by the first data-caching device;
storing the received data by the first backup storage device;
configuring a switch to communicatively couple the first data-caching device to a second data-directing device responsive to a backup operation failure; and
transferring data stored by the first data-caching device to a second backup storage device via the second data-directing device, wherein the first data-directing device is configured to mimic the first backup storage device when the second backup storage device is in use.

7. The method of claim 6, wherein the switch is a fibre channel switch.

8. The method of claim 6, wherein the backup storage devices are storage medium drives.

9. The method of claim 6, wherein the received data is stored on a storage medium by the first backup storage device.

10. The method of claim 6, wherein storing the received data by the first data-caching device and storing the received data by the first backup storage device are performed substantially simultaneously.

11. A system for backing up information, comprising:
a data-directing device configured to receive data to be backed up;
a first backup storage device that is communicatively coupled to the data-directing device and that is configured to store the received data;
a data-caching device that is coupled to the data-directing device and that is configured to store the received data;
a switch that is configured to communicatively couple the data-directing device to a second backup storage device responsive to a backup operation failure, wherein data stored in the data-caching device is transferred to the second backup storage device via the data-directing device responsive to the backup operation failure, wherein the data-directing device is configured to mimic the first backup storage device when the second backup storage device is in use.

12. The system of claim 11, wherein the switch is a fibre channel switch.

13. The system of claim 11, wherein the backup storage devices are storage medium drives.

14. The system of claim 11, wherein the received data is stored on a storage medium by the first backup storage device.

15. The system of claim 11, wherein storing the received data by the data-caching device and storing the received data by the first backup storage device are performed substantially simultaneously.

16. A system for backing up information, comprising:
a first data-directing device configured to receive data to be backed up;
a first backup storage device that is communicatively coupled to the first data-directing device and that is configured to store the received data;
a data-caching device that is coupled to the first data-directing device and that is configured to store the received data;
a switch that is configured to communicatively couple a second data-directing device to the data-caching device responsive to a backup operation failure, wherein data stored in the data-caching device is transferred to a second backup storage device via the second data-directing device responsive to the backup operation failure, wherein the first data-directing device is configured to mimic the first backup storage device when the second backup storage device is in use.

17. The system of claim 16, wherein the switch is a fibre channel switch.

18. The system of claim 16, wherein the backup storage devices are storage medium drives.

19. The system of claim 16, wherein the received data is stored on a storage medium by the first backup storage device.

20. The system of claim 16, wherein storing the received data by the first data-caching device and storing the received data by the first backup storage device are performed substantially simultaneously.

* * * * *